July 9, 1929.  J. T. KETCHUM  1,720,333
CIRCULATOR FOR HOT WATER SYSTEMS
Filed Aug. 25, 1928

Inventor:
James T. Ketchum

Patented July 9, 1929.

1,720,333

UNITED STATES PATENT OFFICE.

JAMES T. KETCHUM, OF CHICAGO, ILLINOIS.

CIRCULATOR FOR HOT-WATER SYSTEMS.

Application filed August 25, 1928. Serial No. 301,958.

This invention relates to a circulator for hot water systems.

In hot water systems such as those used for heating houses, it is well-known that good circulation of the water cannot be had without raising the temperature of the entire system to a fairly high point. It frequently happens that this amount of heat is not required and consequently when a smaller amount of heat only is needed, a sluggish circulation results with consequent inefficiency and lack of heat transmission. It is apparent therefore that in systems as usually constructed the flexibility and the efficiency so much desired are absent.

This invention is designed to overcome the defects noted above, and objects of such invention are to provide a novel form of circulator which is particularly adapted for circulating the water in hot water heating systems, and which is so constructed that it will insure a rapid and effective circulation of water, irrespective of the temperature of the system, and also which is so made that it will not obstruct the free flow of the water even when the device is not running.

Further objects are to provide a circulator particularly adapted for hot water systems, which is so made that it may be readily inserted in the system, preferably in the cold water return, with a minimum alteration in the pipes.

A further object of this invention is to provide a compact and simple device, which may be economically made.

An embodiment of the invention is shown in the accompanying drawing, in which:—

Figure 1:
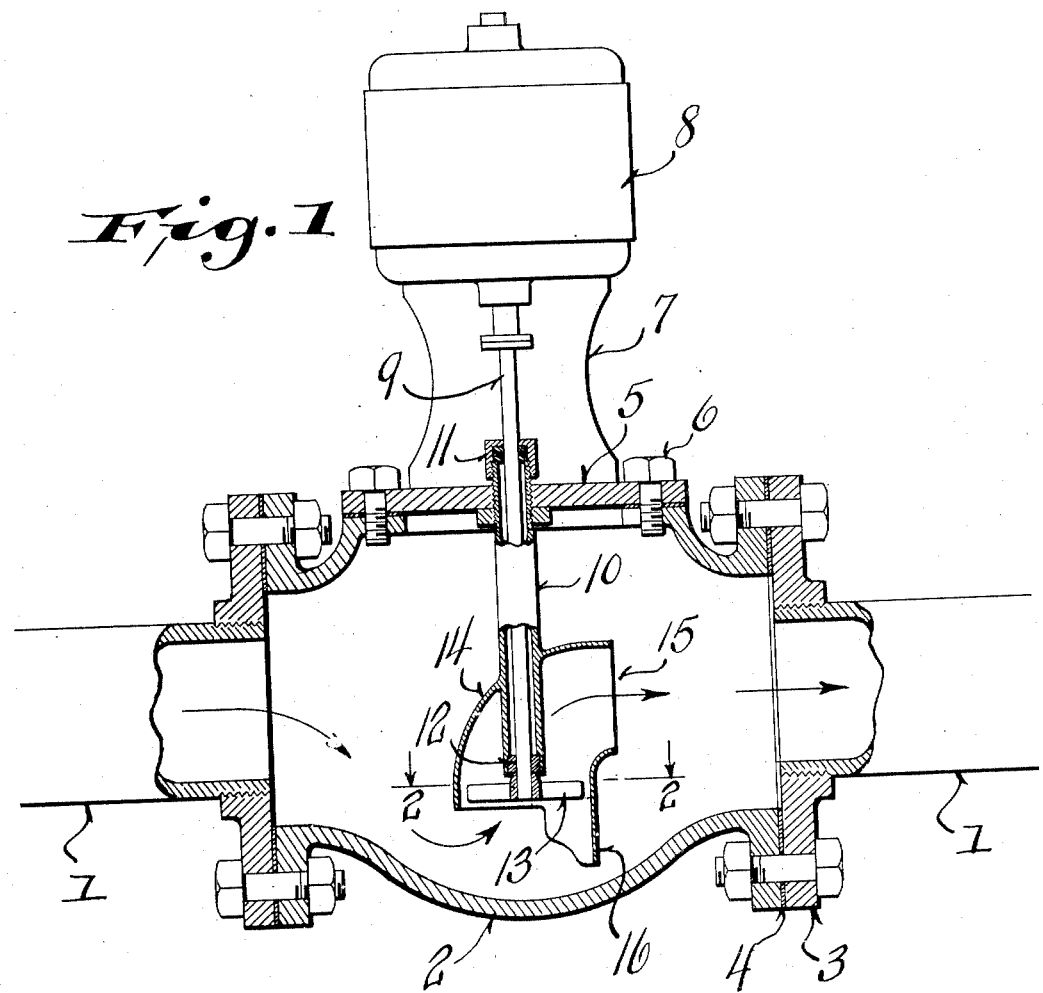
Figure 1 is a sectional view through the device.
Figure 2:
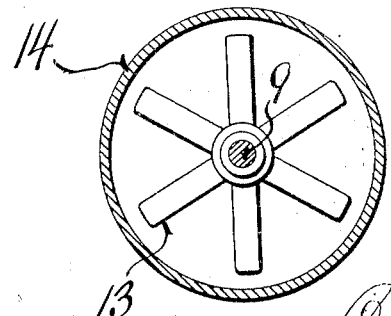
Figure 2 is an enlarged sectional view on the line 2—2 of Figure 1.

Referring to the drawings, it will be seen that the cold water return pipe is indicated by reference character 1. This pipe is cut in two and the ends threaded so as to make room for the reception of the device.

The device comprises a main body portion 2 which may be of the general shape of a large globe valve. This casing is entirely open in its interior and is provided with end flanges to which are bolted the threaded coupling members 3 which are secured upon the ends of the pipe 1 and are thereafter bolted to the casing 2, a suitable gasket 4 being interposed. The casing 2 is provided with an opening adapted to be closed by the removable plate 5 which is held in place by means of cap screws 6. This plate has an integrally projecting ledge or web 7 which carries a small electric motor 8. This motor may of course be supported in any suitable manner from the bracket 7 and may be cushioned, if desired, although this structure is not shown.

The motor shaft is coupled to an impeller shaft 9 which extends downwardly through a tubular stem 10 screwed into and locked to the plate 5, as shown in Figure 1. This stem is threaded at its upper end and receives the cap 11 which holds the packing for the shaft. The lower end of the stem is provided with a metal sleeve or collar 12 which forms the inner bearing for the shaft. Preferably the space within the tubular member 10 is filled with oil or grease. The inner end of the shaft is provided with a multi-bladed impeller 13. This impeller is mounted closely adjacent the bearing or sleeve 12 so as to avoid vibration. The tube 10 is preferably integrally formed with an elbow member 14 which has a downwardly opening portion into which the water enters and which has an outwardly projecting opening portion 15, which is in direct alinement with the outgoing pipe.

A small skirt or web 16 is formed on the elbow portion on its front side, as shown in Figure 1, so as to constitute in effect a baffle for the lower portion, to thus prevent the impeller from drawing water from the discharge side of the elbow member. The elbow member 14 thus constitutes an inner casing suspended within or carried within the main casing 2 and spaced therefrom.

It is to be noted particularly that the area around the inner casing and inside of the outer casing is very much larger than the cross sectional area of the pipe 1, and consequently even when the impeller is not in operation, no obstruction is offered to the free flow of water.

However, when the impeller is in operation, the water is drawn inwardly from the laterally open portion of the inner casing and projected outwardly from the axially open portion of the inner casing. The device thus acts as an ejector as the rapidly flowing stream of water projected from the mouth of the inner casing entrains additional water and forces a swiftly traveling volume of water through the pipe 1, thus greatly increasing the circulation.

It has been found with actual tests of this device that a very great increase in the efficiency of the heating system results, and also it has been found that it is not necessary to run the device all the time, as no obstruction is offered to the free flow of the water even when the device is not in operation.

It is to be understood that the shaft 9 may extend either vertically or horizontally as desired, without altering the effectiveness of the apparatus.

It will be seen that a very simple and serviceable type of device has been provided, which is easy to construct and easy to assemble, which is so made that it lubricates itself or runs in oil, and which also offers no obstruction to the free flow of water even when the device is not in operation.

Although the invention has been described in considerable detail, such description is intended as illustrative rather than limiting as the invention may be variously embodied and as the scope of such invention is to be determined as claimed.

I claim:—

A circulating device for a hot water system comprising a main casing having an inlet and an outlet portion, said main casing having a laterally extending opening, a closure plate for said laterally extending opening, an electric motor supported from said closure plate, a tubular member carried by said closure plate and projecting into said main casing, an auxiliary casing formed in elbow shape carried by said tubular portion and having an outlet end in alinement with the outlet portion of said main casing, a shaft connected to said motor and extending through said tubular portion, bearing members at the ends of said tubular portion, and an impeller carried by the inner end of said shaft and located within said auxiliary casing.

In testimony that I claim the foregoing I have hereunto set my hand at Milwaukee, in the county of Milwaukee and State of Wisconsin.

JAMES T. KETCHUM.